(12) United States Patent
Cho et al.

(10) Patent No.: US 12,482,296 B2
(45) Date of Patent: Nov. 25, 2025

(54) DEVICE AND METHOD FOR INFERRING INTERACTION RELATIONSHIP BETWEEN OBJECTS THROUGH IMAGE RECOGNITION

(71) Applicant: KOREA INSTITUTE OF SCIENCE AND TECHNOLOGY, Seoul (KR)

(72) Inventors: Junghyun Cho, Seoul (KR); Haksub Kim, Seoul (KR); Gi Pyo Nam, Seoul (KR); Hyungjoo Jung, Seoul (KR); Ig Jae Kim, Seoul (KR); Soyoung Kim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 390 days.

(21) Appl. No.: 17/973,140

(22) Filed: Oct. 25, 2022

(65) Prior Publication Data
US 2023/0177880 A1    Jun. 8, 2023

(30) Foreign Application Priority Data
Dec. 7, 2021    (KR) ......................... 10-2021-0173893

(51) Int. Cl.
G06V 40/20    (2022.01)
G06T 7/20    (2017.01)
G06V 10/82    (2022.01)

(52) U.S. Cl.
CPC ............... *G06V 40/20* (2022.01); *G06T 7/20* (2013.01); *G06V 10/82* (2022.01); *G06T 2207/30241* (2013.01)

(58) Field of Classification Search
None
See application file for complete search history.

(56) References Cited

U.S. PATENT DOCUMENTS

| | | | |
|---|---|---|---|
| 2016/0092727 A1 | 3/2016 | Ren et al. | |
| 2018/0290019 A1* | 10/2018 | Rahimi | G09B 19/0038 |
| 2018/0349704 A1* | 12/2018 | Mehseresht | G06F 18/295 |
| 2020/0104323 A1 | 4/2020 | Kam et al. | |

(Continued)

FOREIGN PATENT DOCUMENTS

| | | |
|---|---|---|
| KR | 10-2019-0077654 A | 7/2019 |
| KR | 10-2019-0107614 A | 9/2019 |

(Continued)

OTHER PUBLICATIONS

StagNet: An Attentive Semantic RNN for Group Activity and Individual Action Recognition, by Qi et al., IEEE Transactions on Circuits and Systems for Video Technology, vol. 30, No. 2, Feb. 2020, pp. 549-565 (Year: 2020).*

(Continued)

*Primary Examiner* — Vikkram Bali
(74) *Attorney, Agent, or Firm* — NSIP Law

(57) ABSTRACT

Disclosed is a device and method for inferring a correlation between objects through image recognition. The device for inferring a correlation between objects through image recognition according to an embodiment comprises a communicator and an interaction inferencer configured to select a main object interacting with a target object at a predetermined distance in the input image or generate a social graph including the main object and the target object.

18 Claims, 8 Drawing Sheets

(56) References Cited

U.S. PATENT DOCUMENTS

| | | | |
|---|---|---|---|
| 2021/0118169 A1 | 4/2021 | Lee et al. | |
| 2021/0225013 A1 | 7/2021 | Kim et al. | |
| 2024/0242462 A1* | 7/2024 | Liao | G06V 10/82 |

FOREIGN PATENT DOCUMENTS

| | | |
|---|---|---|
| KR | 10-2185777 B1 | 12/2020 |
| KR | 10-2282830 B1 | 7/2021 |

OTHER PUBLICATIONS

Chen, Hua-Tsung, et al. "Recognizing tactic patterns in broadcast basketball video using player trajectory." Journal of Visual Communication and Image Representation 23.6 (2012): 932-947.

\* cited by examiner

DEVICE AND METHOD FOR INFERRING INTERACTION RELATIONSHIP BETWEEN OBJECTS THROUGH IMAGE RECOGNITION

CROSS-REFERENCE TO RELATED APPLICATION

This application claims priority to Korean Patent Application No. 10-2021-0173893, filed on Dec. 7, 2021, and all the benefits accruing therefrom under 35 U.S.C. § 119, the contents of which in its entirety are herein incorporated by reference.

BACKGROUND

1. Field

Embodiments of the present disclosure relate to a system and method for inferring a correlation between an object and another object in an input image through image recognition.

2. Description of Government-Supported Research and Development

This study was conducted by the support of the Ministry of Science and ICT, and Korea Institute of Science and Technology Research Operating Expense Support (R&D) [Title of Study: Development of MIDAS source technology to lead the surgery 4.0 era, Project Number: 1711152122, Detailed Project Number: 2 E31070].

3. Description of the Related Art

In the process of looking for a missing person, it is the most important to acquire information of the missing person. Police conduct search and investigation to look for the missing person. The investigation provides important information for search. When people with disabilities and patients with dementia do not look any different from non-disabled people, it is difficult for ordinary people to report and search. Accordingly, searching and investigating not only the relationship of the missing person in daily life but also people having a significant relationship with the missing person after missing may provide important information to the police.

SUMMARY

According to an aspect of the present disclosure, there is provided a device for inferring a correlation between objects through image recognition.

In addition, there may be provided a method for inferring a correlation between objects through image recognition and a non-transitory computer-readable recording medium having recorded thereon a program for performing the same.

A device for inferring a correlation between objects through image recognition according to an aspect of the present disclosure may comprise a communicator to receive an image from a plurality of imaging devices; and an interaction inferencer configured to select a main object interacting with a target object at a predetermined distance in the input image or generate a social graph including the main object and the target object.

In an embodiment, the interaction inferencer may include an attribute extractor configured to extract attributes of an object in the image to generate object information; a trajectory calculator configured to calculate a trajectory of the object, wherein the trajectory calculator is configured to include a captured trajectory or an expected trajectory of the object; and a main object selector configured to select a nearby object found within a predetermined distance from the target object along the trajectory of the target object among other objects than the target object, and select the main object interacting with the target object among the selected nearby objects.

In an embodiment, the main object selector may be configured to select the main object by extracting interaction attributes between the selected nearby object and the target object. The interaction attributes may include at least one of a first type of interaction attribute, a second type of interaction attribute or a third type of interaction attribute. The first type of interaction attribute is an attribute of the nearby object itself, the second type of interaction attribute relies on a distance between the nearby object and the target object, and the third type of interaction attribute is a predefined action that when it is recognized that the action is done by a particular object, the particular object is regarded as the main object.

In an embodiment, the first type of interaction attribute may include at least one of a distance range value for determining as the nearby object, whether the object appeared in a view of the imaging device within the predetermined distance, an appearance frequency, a time for each appearance interval or a total appearance time.

In an embodiment, the second type of interaction attribute may include at least one of a distance between the nearby object and the target object, a change in the distance between the nearby object and the target object over time, or regularity of the distance between the nearby object and the target object over time.

In an embodiment, the third type of interaction attribute may be at least one event attribute predefined as an action of a main person, and may be extracted by a pre-trained action recognizer. The action recognizer includes a classification network to recognize the action of each detected object based on a set of attributes, and the classification network is trained using a training dataset. The training dataset includes a plurality of training samples, and each training sample includes at least one of attributes calculated from a training object and label data indicating the particular action predefined as the event.

In an embodiment, the set of attributes may include all or some of the attributes extracted by the attribute extractor.

In an embodiment, the action recognizer may further include an attribute extraction network to generate a set of semantic attributes for each of at least one object detected in the input image. The semantic attributes include at least one of an object probability with which the object is classified as a class, or an attribute probability indicating a probability of each attribute among the attributes associated with the object.

In an embodiment, the main object selector may be further configured to grade the selected main object by calculating an interaction index indicating an interaction level between each main object and the target object.

In an embodiment, the interaction index may be calculated based on a weight for each of all or some of the interaction attributes.

In an embodiment, the interaction index may be calculated further based on a value of an event attribute.

In an embodiment, the interaction index S may be calculated through the following equation, $$S \leftarrow (\lambda_P P_{ij} \cdot \lambda_T T_{ij} \cdot \lambda_f f_{ij}) + e_{ij} \quad \text{[Equation]}$$

where P denotes a distance between the main object and the target object among the interaction attributes, T denotes an appearance time of the main object, f denotes an appearance frequency of the main object, $\lambda$ denotes a weight for each attribute, e denotes the value of the event attribute, i denotes an image index of the target object in the entire input image, and j denotes an image index of the nearby object.

In an embodiment, the main object selector may be configured to calculate an interaction index for each selected nearby object, and select, as the main object, the nearby object having the calculated interaction index for each nearby object exceeding a preset recommendation threshold value.

In an embodiment, the main object selector may be further configured to select the main object having an $n^{th}$ ordered relationship of interaction extended from the target object, wherein n is an integer of 2 or greater, and the $n^{th}$ ordered main object may be calculated by replacing the target object with an $n-1^{th}$ ordered main object in an inference process used to calculate a primary main object.

In an embodiment, the device for inferring a correlation between objects through image recognition may further include a graph generator configured to generate a social graph of tree structure by linking the main object from the target object.

In an embodiment, the graph generator may generate a social graph connected to a pre-stored map.

A method for inferring a correlation between objects through image recognition performed by a processor, according to another aspect of the present disclosure, may include extracting attributes of an object in an input image to generate object information; searching for a target object among the objects in the input image by inputting a command for starting an operation of inferring a main object interacting with the target object, wherein the command includes the attributes of the target object; calculating a trajectory of the target object; selecting a nearby object within a predetermined distance on the trajectory of the target object; and selecting a main object interacting with the target object among the nearby objects.

In an embodiment, the command may further include at least one of a condition for interaction attributes, a condition for a range of the main object or a condition for a recommendation threshold value.

In an embodiment, selecting the nearby object may include extracting the interaction attributes between the selected nearby object and the target object, and selecting the main object based on the extracted interaction attributes for each nearby object.

In an embodiment, selecting the nearby object may include calculating an interaction index for each nearby object; and selecting a final main object to recommend when the calculated interaction index for each nearby object exceeds a recommendation threshold value.

A non-transitory computer-readable recording medium according to still another aspect of the present disclosure may record a program for performing the method for inferring a correlation between objects through image recognition according to the above-described embodiments.

The device for inferring a correlation between objects through image recognition according to an aspect of the present disclosure may recommend a witness who saw a missing person and an assailant who committed physical contact upon a victim by inferring a main object interacting with a target object. As a result, it is possible to increase efficiency of a task of searching for people involved in an accident having a relationship with parties to the accident.

The effects of the present disclosure are not limited to the above-mentioned effects, and other effects not mentioned herein will be clearly understood by those skilled in the art from the appended claims.

BRIEF DESCRIPTION OF THE DRAWINGS

The following is a brief introduction to necessary drawings in the description of the embodiments to describe the technical solutions of the embodiments of the present disclosure or the prior art more clearly. It should be understood that the accompanying drawings are for the purpose of describing the embodiments of the present disclosure and are not intended to be limiting of the present disclosure. Additionally, for clarity of description, illustration of some elements in the accompanying drawings may be exaggerated and omitted.

DETAILED DESCRIPTION

The term "comprising", "comprises", "including" or "includes" when used in this specification, specifies the presence of stated features (for example, integers, functions, operation, steps, elements and/or components), but does not preclude the presence or addition of one or more other features.

It should be understood that when an element is referred to as being "connected to" or "coupled to" another element, it can be directly connected or coupled to the other element or intervening elements may be present. In contrast, it should be understood that when an element is referred to as being "directly connected to" or "directly coupled to" another element, there is no intervening element.

The terms "first", "second or the like when used in various embodiments may describe various elements irrespective of the order and/or importance, and do not limit the corresponding elements. These terms may be used to distinguish one element from another. For example, a first element and a second element may represent different elements irrespective of the order or importance.

The term "configured to (or set to)" as used herein may be, for example, interchangeably used with "suitable for" "having the capacity to" "designed to" "adapted to" "made to" or "capable of" depending on situations. The term "configured to (or set to)" may not necessarily represent "specifically designed to" in hardware. Instead, in a certain situation, the term "a device configured to" may represent that the device may "work" with other devices or components. For example, the term "a processor configured (or set) to perform A, B, and C" may refer to a dedicated processor (for example, an embedded processor) for performing the corresponding operation, or a generic-purpose processor (for example, a CPU or an application processor) capable of performing the corresponding operations by running at least one software program stored in a memory device.

Hereinafter, the embodiments of the present disclosure will be described in detail with reference to the accompanying drawings.

Figure 1:
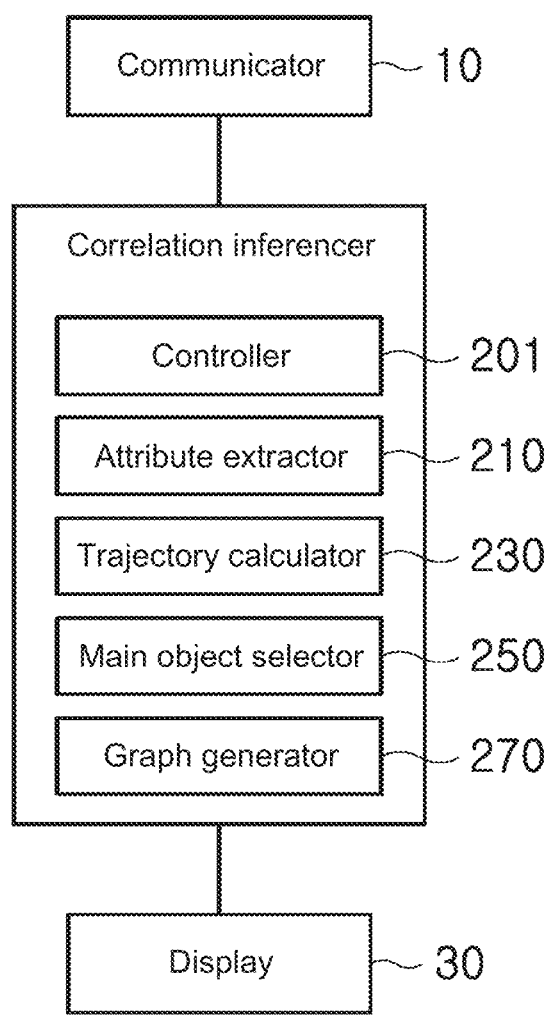
FIG. 1 is a block diagram of a device for inferring a correlation between objects through image recognition according to an aspect of the present disclosure.
Figure 2:
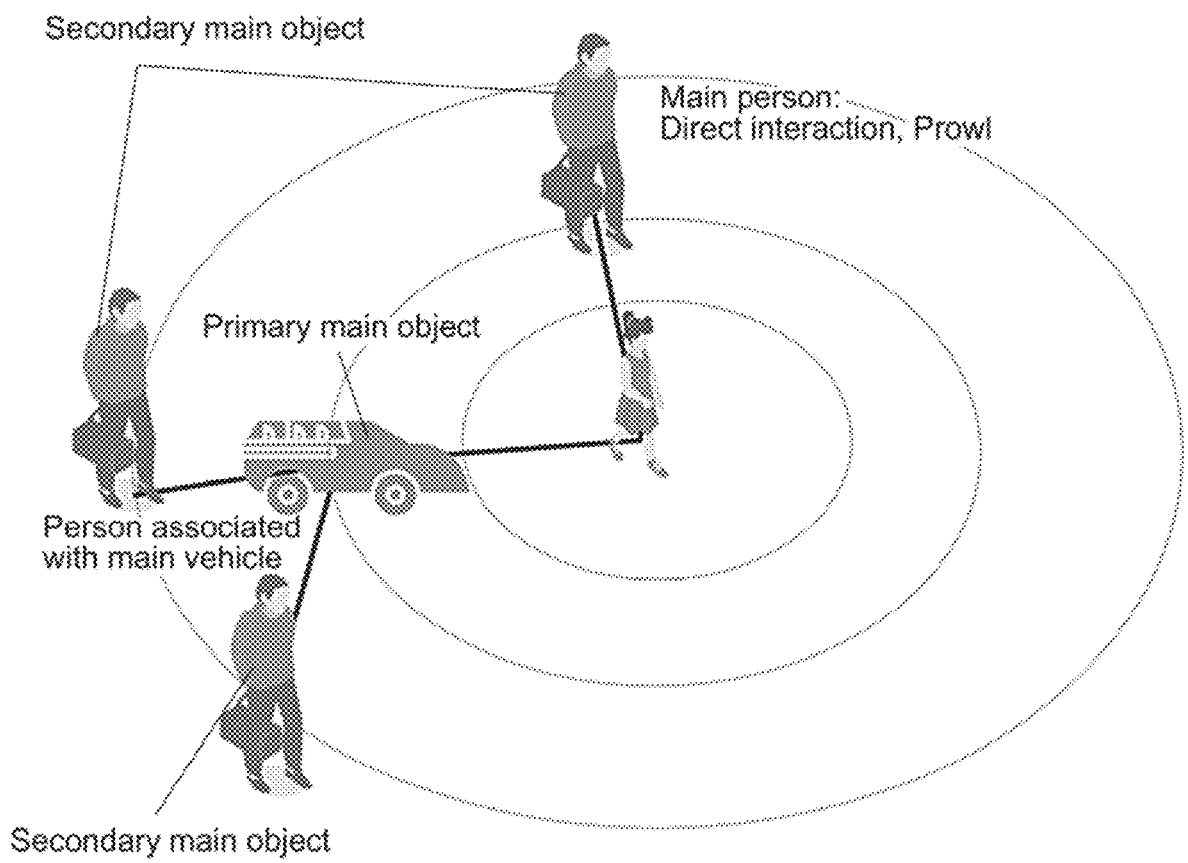
FIG. 2 is a schematic diagram of the operation of a device for inferring a correlation between objects through image recognition according to an embodiment of the present disclosure.

FIG. 1 is a block diagram of a device for inferring a correlation between objects through image recognition according to an aspect of the present disclosure, and FIG. 2 is a schematic diagram of the operation of the device for inferring a correlation between objects through image recognition according to an embodiment of the present disclosure.

Referring to FIG. 1, the device 1 for inferring a correlation between objects through image recognition includes a communicator 10; a correlation inferencer 20; and a display 30.

Referring to FIG. 2, the device 1 for inferring a correlation between objects through image recognition may infer a main object (for example, a main person or a main vehicle) having a close interactive relationship with a target object.

The device 1 for inferring a correlation between objects through image recognition according to the embodiments may have aspects of entirely hardware, entirely software, or partly hardware and partly software. For example, a system may refer collectively to hardware capable of processing data and software that manages the hardware. The term "unit", "module", "device", or "system" as used herein is intended to refer to a combination of hardware and software that runs by the corresponding hardware. For example, the hardware may be a data processing device including a Central Processing Unit (CPU), a Graphic Processing Unit (GPU) or other processor. Additionally, the software may refer to a process being executed, an object, an executable, a thread of execution and a program.

The communicator 10 wiredly/wirelessly communicates with a plurality of imaging devices (not shown) and receives imaging data including image data from each imaging device. The image data is used as an input image for inference.

The imaging device may include an image sensor, a camera and a closed-circuit television (CCTV). The image data may create images in various formats, for example, a capture image and a video.

The object is an object that moves at least in part or may affect other object by transmitting a physical signal. The object includes a person and an article (for example, a vehicle, a bicycle, a motorcycle).

The interaction includes two-way interaction indicating that the object recognizes other object affected by the object and affecting the object and/or one-way interaction indicating that the object does not recognize other object affecting the object. The two-way interaction includes, for example, a physical contact, a fight and a conversation. The one-way interaction includes, for example, prowling and stalking.

The plurality of imaging devices may be installed at a plurality of locations in an area. All or some of the plurality of imaging devices may be installed near a path facility (for example, a road) in which the object may move. When the target object moves along the path facility, all or some of the plurality of imaging devices may capture an image of the target object and transmit the image data including the target object to the communicator 10.

When other object is near the target object, the image data including the target object and the other object is transmitted to the communicator 10.

The image data received by the communicator 10 is provided to the correlation inferencer 20.

The correlation inferencer 20 may infer an interaction between the target object and the other object through image recognition to generate an image history. The correlation inferencer 20 detects at least one other object, and determines a particular object (for example, the main object) doing a significant interaction by inferring the interaction between the target object and the detected object.

The correlation inferencer 20 may include a controller 201, an attribute extractor 210, a trajectory calculator 230 and a main object selector 250. In some embodiments, the correlation inferencer 20 may further include a graph generator 270.

The controller 201 includes at least one processor configured to control the other components 210 to 270 to perform the operation of the device for inferring a correlation between objects through image recognition.

The controller 201 may control the other components 210 to 270 to select the main object doing a close interaction with the target object in the input image in response to a user input or generate a social graph. The series of operations by the control of the controller 201 will be described below in more detail with reference to FIG. 5.

The operations of the device 1 performed by the control of the controller 201 over the other elements will be described below in more detail with reference to FIG. 4.

The attribute extractor 210 extracts attributes of the object in the image to generate object information. The attribute extractor 210 may detect the object in the image and extract the attributes from the detected object.

The detection of the object is performed by setting a silhouette of the object in the image or a patch area including the same.

The attribute extractor 210 may extract primary attributes used to identify the object, represented in all or part (for example, the silhouette area) of the patch area. The primary attributes are attributes commonly used in image recognition, and include, for example, shape attributes and/or appearance attributes.

The shape attributes are, for example, attributes describing the height, the object's silhouette shape, the body proportions and the lengths of body parts (for example, the hair length, the arm's length).

The appearance attributes are, for example, attributes describing color and accessories, represented on the appearance of the object.

Additionally, the attribute extractor 210 may further extract secondary attributes based on the primary attributes.

The secondary attributes may include an object identification result. The object identification result relies on the identification performance of the attribute extractor 210. When the attribute extractor 210 is configured to classify the type of the object, the extracted attributes may include the type of the object. The type of the object is classified into a person or an article. In some embodiments, in the type of the object, the article type may be classified into a plurality of types. For example, the type of the object may be classified into a person, a vehicle or a non-vehicle.

The attribute extractor 210 may form object information for each detected object. The object information is used to search for the user's desired object (for example, the target object) among the objects in the input image.

When attribute information describing the target object is inputted, the device 1 may search for an object having attribute information that matches the input attribute information as the target object. When the target object is found, the device 1 may search for an image including the target object among the images received through the communicator 10. Additionally, the device 1 may mark up to distinguish the target object from other object or a background in the found image.

The trajectory calculator 230 calculates a trajectory of the object. The trajectory calculator 230 may calculate a path (i.e., a captured trajectory) along which the object moved in the image through time and space.

The trajectory calculator 230 may calculate the captured trajectory of the object by calculating the direction, the movement time and/or the movement speed of the object in the image.

In an embodiment, the trajectory calculator 230 may calculate the captured trajectory of the object further based on the capture location of the corresponding object, the installation location of the imaging device that captured the image of the corresponding object, the path facility to which the capture location of the corresponding object belongs, and/or other path facility connected to the path facility to which the capture location of the corresponding object belongs on the path. To this end, the trajectory calculator 230 may access an internal database or a database on a web server to search for structure data of various path facilities.

For example, the trajectory calculator 230 may calculate the speed of the object within the view of the particular imaging device by analyzing the object represented in a series of frame captured by the particular imaging device, search for a structure of a road across which the object goes by searching for a location to which the object moved, and calculate the captured trajectory of the object based on the speed of the object and the structure of the road.

Additionally, the trajectory calculator 230 may be further configured to calculate a path (hereinafter, a predicted trajectory) along which the object moved in a non-captured geographic area.

The trajectory calculator 230 may be further configured to calculate the predicted trajectory on the non-captured geographic area in which the image of the object is not captured based on all or part of the image analysis results used to calculate the captured trajectory and/or the calculated captured trajectory. For example, the trajectory calculator 230 may calculate the predicted trajectory of the object based on the movement direction of the object, the calculated captured trajectory and other path facility connected to the calculated captured trajectory on the path.

The trajectory calculator 230 may calculate the trajectory (for example, including the captured trajectory, or a combination of the captured trajectory and the predicted trajectory) of the target object. For example, when the target object is found by the device 1, the trajectory calculator 230 may calculate the trajectory of the target object based on the direction of the target object in each image.

Additionally, the trajectory calculator 230 may calculate the trajectory of the main object.

The main object selector 250 selects the main object interacting with the target object among objects other than the target object in the images from the plurality of imaging devices. In general, it is because the user is primarily interested in the target object and other object interacting with the target object.

In an embodiment, the main object selector 250 may select a nearby object appearing within a predetermined distance from the target object along the trajectory of the target object.

The distance between objects is set to a value set by the user. The set value may be a value in the unit of meter, but is not limited thereto.

The main object selector 250 may filter an object within the predetermined distance along the trajectory of the target object as the nearby object.

Additionally, the main object selector 250 may extract interaction attributes between the selected nearby object and the target object. The main object selector 250 may select the main object based on the interaction attributes for each of the extracted nearby objects.

In an embodiment, the interaction attributes include a first type of interaction attribute, a second type of interaction attribute and/or a third type of interaction attribute.

The first type of interaction attribute is an attribute of the nearby object itself. In an embodiment, the first type of interaction attribute may include whether the object appeared in the view of the imaging device within the predetermined distance (i.e., whether the target object appeared in the input image concurrently or sequentially), the appearance frequency, the time for each appearance interval and/or the total appearance time.

The time for each appearance interval may be the duration of interaction between the nearby object and the target object.

The appearance frequency of the object is calculated based on the detection results in the images of the various imaging devices.

Some nearby persons who appear frequently within the predetermined distance or repeatedly at a regular time interval in the image of the target object are selected as the main object.

The second type of interaction attribute relies on the distance between the nearby object and the target object.

In an embodiment, the second type of interaction attribute may include the distance between the nearby object and the target object, a change in distance between the nearby object and the target object over time, and/or regularity in distance between the nearby object and the target object over time.

The distance between the nearby object and the target object has a predetermined distance value as a maximum value.

The regularity relies on a distance pattern. The nearby person having the similar trajectory to the target object while maintaining the predetermined interval may selected as the main object. Alternatively, when the frequency is relatively low but repeatedly continues for the predetermined time interval at a particular time, it may be selected as the main object.

The third type of interaction attribute is an event attribute. The event attribute is an attribute describing a significant action that when it is recognized that the action is done by a particular object, the particular object may be regarded as the main object.

In an embodiment, the third type of interaction attribute may include at least one event attribute set as the main person's action. The third type of interaction attribute may include, for example, attributes indicating recognition of each of boarding, a fall, a fight, a conversation and a physical contact.

In some embodiments, the main object selector 250 may include an action recognizer to visually analyze a video image. The action recognizer is a machine learning model trained to recognize the object's action predefined as the event in the input image.

The action recognizer includes an attribute extraction network and a classification network. The action recognizer may be implemented with a CNN-RNN structure, but is not limited thereto.

The attribute extraction network generates a set of semantic attributes for each of at least one object detected in the input image.

The semantic attributes in the set include an object probability indicating a probability with which the object is classified as a class and/or an attribute probability indicating a probability of having each attribute among the attributes associated with the object.

For example, when $a_1$ and $a_2$ are extracted as attributes associated with the object from the object, the attribute extraction network may calculate a probability that the object will actually have each of the attributes a1, a2 as the attribute probability.

The classification network recognizes the action of each detected object based on the set of semantic attributes generated. The action of the object is classified as an interactive action or a non-interactive action by analyzing interactions of the actions of the detected objects by the classification network.

The attribute extraction network is trained through various machine learning schemes for classifying the class of the object or extracting the attributes of the object.

The classification network is trained using a training dataset. The training dataset includes a plurality of training samples, and each training sample includes the object probability and/or the attribute probability calculated from a training object and label data indicating the particular action predefined as the event. The classification network is trained to recognize the action corresponding to the event based on the set of input attributes.

Additionally, the main object selector 250 may extract event attributes of the nearby object based on the trajectory of the target object and the trajectory of the corresponding nearby object.

In an embodiment, when the time of the target object and the time of the nearby object on the dead space of the imaging device overlap at least in part, the main object selector 250 may recognize that there is a physical contact between the corresponding nearby object and the target object. Then, the main object selector 250 may extract the event attribute corresponding to the physical contact from the nearby object in the dead space at the overlap time with the target object on the trajectory.

Each attribute value may be scored according to a preset rule. For example, the object probability value may be scored in percentage.

In alternative embodiments, the action recognizer may generate the set of semantic attributes using all or some of the processing results of the attribute extractor 210, instead of the attribute extraction network.

For example, the object probability may be obtained from the calculation results used to identify the object. Additionally, the attribute probability score may be obtained from the probability calculation results for each attribute when the attributes are extracted from the object.

Additionally, the main object selector 250 may select the main object among other objects according to the user input describing the main object.

For example, when a place to be careful at, a particular image, a particular object (for example, a particular person) is inputted to the device 1, the main object selector 250 may select the nearby person that matches the user input as the main person.

The device 1 may provide the main object selection results to the user.

In alternative embodiments, the main object selector 250 may grade the main object according to the interaction level.

The main object selector 250 may grade the main object by calculating an interaction index between the main object and the target object. The interaction index indicates the interaction level, and the closer interaction between objects, the higher index.

In an embodiment, the interaction index may be calculated based on a weight for each of all or some of the interaction attributes.

For example, the main object selector 250 may calculate the interaction index S through the following equation based on the weight for each interaction attribute of the distance P between the main object and the target object, the appearance time (i.e., the interaction time) T of the main object and the appearance frequency f of the main object and each interaction attribute value.

$$S \leftarrow (\lambda_P P_{ij} \cdot \lambda_T T_{ij} \cdot \lambda_f f_{ij}) \qquad \text{[Equation 1]}$$

Here, $\lambda$ is the weight for each attribute P, T, f. The calculation of each interaction attribute value has been described above and its detailed description is omitted.

Here, i denotes an image index of the particular target object, and j denotes an image index of the nearby object. Since the nearby object and the particular target object form a relationship pair, j may be treated as an index of the relationship pair.

Additionally, the interaction index may be calculated further based on the event attribute value. In this case, the interaction index S may be calculated through the following equation.

$$S \leftarrow (\lambda_P P_{ij} \cdot \lambda_T T_{ij} \cdot \lambda_f f_{ij}) + e_{ij} \qquad \text{[Equation 2]}$$

The calculation of the event attribute e has been described above and its detailed description is omitted.

In another embodiment, the interaction index may be calculated further based on a predefined weight.

The predefined weight $F_{ij}$ may be a weight calculated from significant information by an expert. The predefined weight may be a predefined value for each main object and for each input image including the main object.

For example, in the device 1 in which the predefined weight is set, the interaction index S may be calculated through the following equation.

$$S \leftarrow F_{ij}(P_{ij}, T_{ij}, f_{ij}, e_{ij}) \qquad \text{[Equation 3]}$$

The main object selector 250 calculates the interaction index for each main object that forms a pair with the target object for each of at least some input images including the main object using these factors and equations.

The main object selector 250 may determine the grade of the main object based on the interaction index. To this end, the main object selector 250 may include a table with recordings of the grade by the interaction index.

The main object selector 250 calculates each interaction index for each nearby object that form a pair with the target object for each of at least some input images including the main object.

The device 1 may provide the graded main object to the user.

Then, the device 1 may provide the grading results to the user, or may provide only some of the main objects as the selection results to the user according to the grade. For example, the device 1 may finally recommend some main objects of the highest grade group for the user.

In other alternative embodiments, the main object selector 250 may be configured to select the main object doing relatively deep interaction among the nearby objects using the interaction index.

The main object doing relatively deep interaction with the target object may be all or some of the main objects selected by the above-described process of extracting the interaction attributes.

In an embodiment, the main object selector 250 may calculate the interaction index between the nearby object and the target object for each nearby object; and select the nearby object having a relatively high interaction index among the interaction indices for each nearby object as the main object. The main object may be finally recommended for the user.

The interaction index for each nearby object may be calculated based on any one of the above Equations 1 to 4.

For example, the main object selector 250 may calculate the interaction index S for each nearby object through an equation in which the variables P, T, f in the above Equation 1 are replaced with the distance P between the nearby object and the target object, the appearance time (i.e., the interaction time) T of the nearby object and the appearance frequency f of the nearby object.

In an embodiment, the main object selector 250 may select the nearby object having the interaction index exceeding a preset recommendation threshold value as the main object. The nearby object exceeding the recommendation threshold value is selected as the main object having a relatively high interaction index.

As described above, the process of calculating the interaction index for each nearby object from the input image including the target object and the nearby object and selecting the main object to finally recommend using the recommendation threshold value may be written by the following algorithm.

```
I = { }  # set of interaction index
for i=1:max(i) #U( image of target object )
    for j=1:max(j) #M( image of nearby object )
        S <- F_ij (P_ij ,T_ij ,f_ij ,e_ij )
        if S > Threshold value
            Include (i,j) in the set of interaction index
        end
    end
end
S_ij = F_ij (P_ij ,T_ij ,f_ij ,e_ij )
I = {(i,j) S_ij > T_ij, i∈ [1,#U], j∈ [1,#M]}
```

Here, U is a group of images of the target objects in the entire input image. I is a group of images of the main objects. M is a group of images of the nearby objects. The nearby object (or the main object) and the target object in the image form a relationship pair. i denotes the image index of the particular target object, and j denotes the image index of the nearby object that forms the relationship pair with the particular target object. Since the image of the nearby object includes the image of the main object, the image index of the main object may be represented as the image index of the nearby object.

When the interaction index for each pair of the target object and the nearby object exceeds the recommendation threshold value, the nearby object is finally selected as the main object.

In alternative embodiments, the device 1 may be further configured to select an $n^{th}$ ordered main object from the target object (n is an integer of 2 or greater). Here, the order refers to the order of the relationship of interaction extended from the target object. The $n^{th}$ ordered main object is selected depending on the interaction between an $n-1^{th}$ ordered main object and another object. The target object is replaced with the $n-1^{th}$ ordered main object in the inference process used to calculate the primary main object.

In an embodiment, the device 1 may additionally select a secondary main object (i.e., n=2) interacting with the main object on the basis of the selected main object. The existing main object interacting with the target object is the primary main object, and all or part of the secondary main objects may not be the nearby object or the primary main object of the target object.

In this case, the main object selector 250 perform the main object selection operations performed with respect to the target object by replacing the center object with the primary main object from the target object. Then, the main object selector 250 select the secondary main object among other objects that interact with the primary main object and are different from the target object.

The main object selector 250 may select the nearby object of the primary main object, extract the interaction attributes between the selected nearby object and the primary main object rather than the target object, and select the secondary main object based on the interaction attributes for each nearby object of each primary main object.

In the Equations 1 to 4 or algorithm, the values of the target object are also replaced with the values of the primary main object.

Additionally, the main object selector 250 may store the main object (for example, a main person, a main vehicle) selected among the nearby objects. The main object selector 250 may generate and store a list of the selected main objects.

The value of the range n of the $n^{th}$ ordered main object may be set by the user input. The value of n may be inputted with the input of information of the target object for the start of inference, or may be inputted when the user is not satisfied with the selection result.

The graph generator 270 may generate a social graph based on the selected main object and the target object. The social graph is a relationship chart including the main object interacting with the target object.

Figure 3:
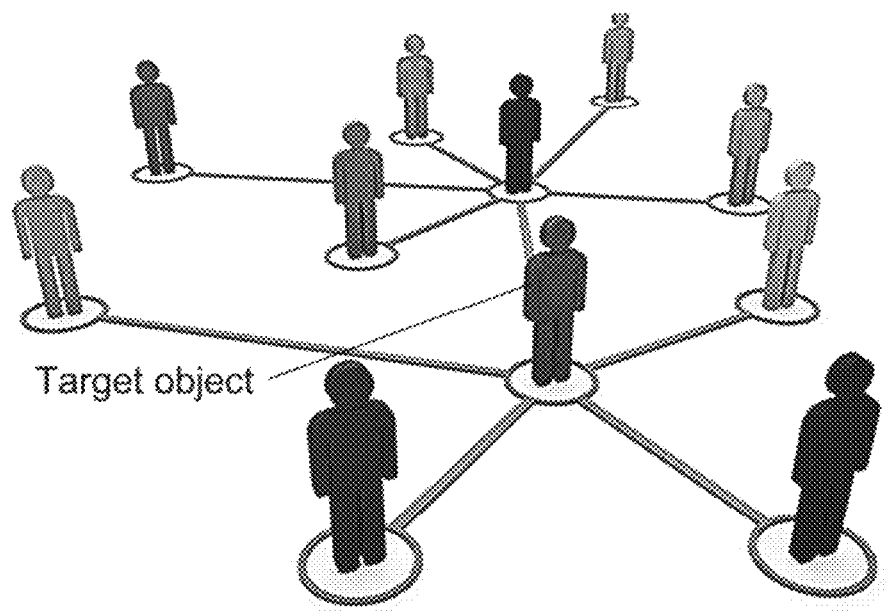
FIG. 3 is a schematic diagram of a social graph according to an embodiment of the present disclosure.

FIG. 3 is a schematic diagram of the social graph according to an embodiment of the present disclosure.

Referring to FIG. 3, the graph generator 270 may generate the social graph by linking the main object from the target object.

The graph generator 270 may generate the social graph of tree structure as shown in FIG. 3.

In an embodiment, the graph generator 270 may generate the social graph representing the grade for each object. The same grade may be equally represented, and different grades may be distinguished.

Additionally, the graph generator 270 may individually represent the shape and color of a node indicating the main object or the target object based on the attributes for each object in the social graph of tree structure.

For example, the social graph representing the class (for example, a person) of the same object in the same color may be generated.

Figure 4A:
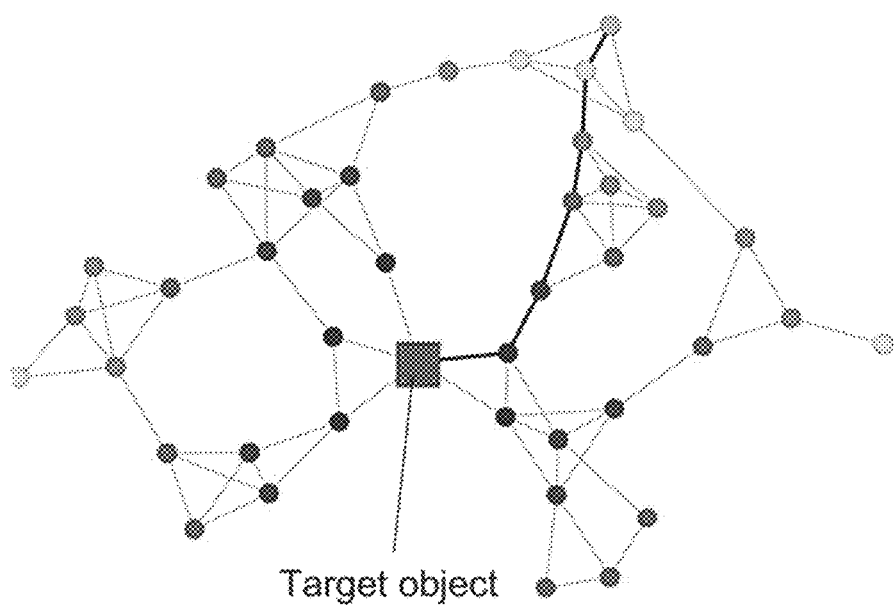
FIGS. 4A and 4B are schematic diagrams of a social graph connected to a map according to an embodiment of the present disclosure.
Figure 4B:
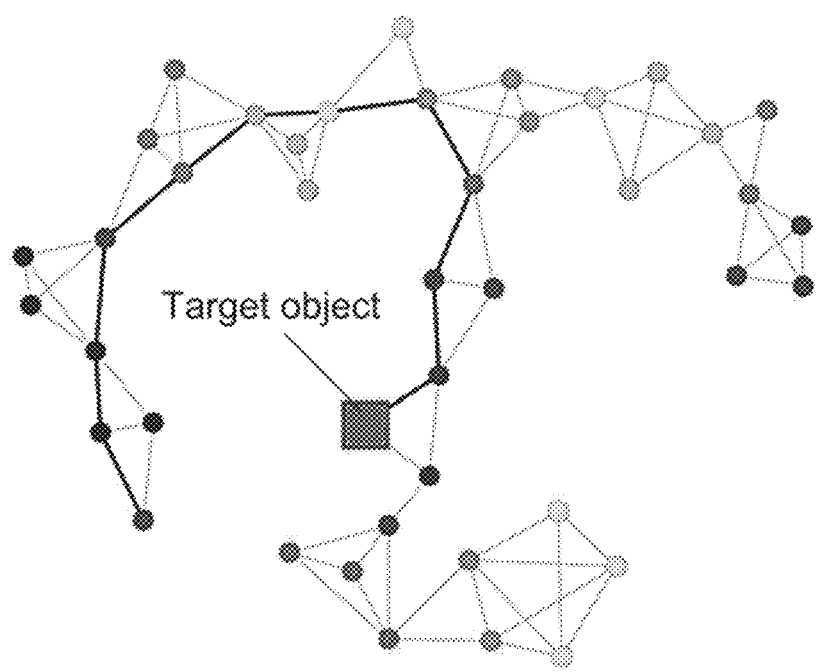

FIGS. 4A and 4B are schematic diagrams of the social graph connected to a map according to an embodiment of the present disclosure.

Referring to FIGS. 4A and 4B, the graph generator 270 may generate the social graph connected to the pre-stored map.

The device 1 may represent the movement of the target object over time on the map. Additionally, the device 1 may represent the movement of the main object over time on the map. Then, the device 1 may generate the social graph connected to the map by connecting the main object and the target object having moved over time on the map.

In an embodiment, the graph generator 270 may generate the social graph including the $n^{th}$ ordered main object. The n value defining the range of the $n^{th}$ ordered main object also defines the expansion range of the social graph.

The controller 201 may provide the calculation process or result by the correlation inferencer 20 to the user through the display 30. For example, the display 30 may display the social graph by the controller 201.

The display 30 is a component that displays data, and may include, for example, a liquid crystal display (LCD), an organic light emitting diode (OLED) and a flexible screen, but is not limited thereto.

It will be obvious to those skilled in the art that the device 1 for inferring a correlation between objects through image recognition may include other components not described herein. For example, the device 1 for inferring a correlation between objects through image recognition may include other hardware elements necessary for the operation described herein, including a network interface, an input device for data entry, a display or other output devices for printing or displaying data.

A method for inferring a correlation between objects through image recognition according to another aspect of the present disclosure may be performed by at least one processor. For example, the method for inferring a correlation between objects through image recognition may be performed by the device 1 for inferring a correlation between objects through image recognition of FIG. 1. Hereinafter, for clarity of description, the method will be described in more detail with reference to the embodiments performed by the device of FIG. 1.

Figure 5:
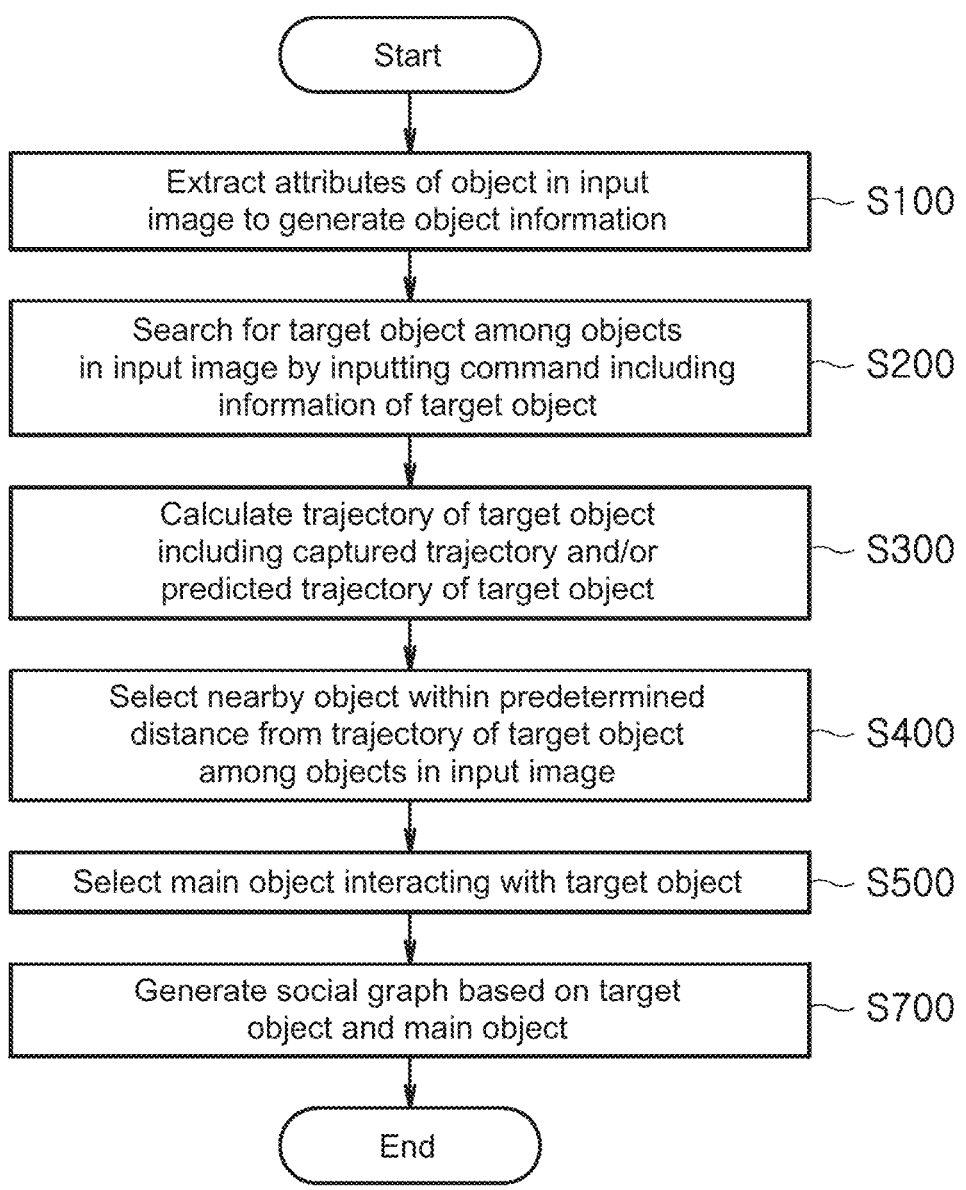
FIG. 5 is a flowchart of a method for inferring a correlation between objects through image recognition according to an embodiment of the present disclosure.

FIG. 5 is a flowchart of the method for inferring a correlation between objects through image recognition according to an embodiment of the present disclosure.

Referring to FIG. 5, the method for inferring a correlation between objects through image recognition includes the step of extracting attributes of an object in an input image received from the plurality of imaging devices to generate object information (S100).

In an embodiment, the step S100 of extracting the attributes of the object may include the step of detecting the object in the input image; and extracting the attributes of the detected object. The attributes of the detected object may include those used to recognize (or identify) the object or the recognition results.

The object information is generated for each object based on the extracted attributes (S100). The extraction of the attributes has been described with reference to the attribute extractor 210, and its detailed description is omitted.

The method includes the step of inputting a command for starting an operation of inferring a main object interacting with a target object (S200). The command includes information of the target object. When the command is inputted, searching for the target object among the objects in the input image starts. In an embodiment, the search of the target object may be conducted by searching for the input image including the target object among the objects in the input image.

The information of the target object includes information describing the target object. In an embodiment, the information of the target object includes attributes of the target object. In response to the input information of the target object, the input image including the object having attributes that match the input attributes is searched (S200). Additionally, the target object may be marked up among the objects in the found input image (S200).

For example, when attributes of a missing person are inputted after the input image of the missing person is received in the step S100, the input image of the missing person is searched (S200).

In an embodiment, the command may further include a condition value for the interaction attributes, a condition value for the range of the main object (i.e., the n value of the $n^{th}$ ordered main object) and/or a condition value for the recommendation threshold value.

The user may input the command including selection conditions such as the distance between the main object and the target object, the appearance time (i.e., the interaction time) and the number of appearances. For example, the user may limit the interaction attributes with a nearby object to a person who appeared in the image at least once for 10 sec or longer within the distance of 2 m as the selection conditions. Then, the main object is selected within the range that satisfies the selection conditions (S300 to S500).

The method includes the step of calculating a trajectory of the target object (S300). The trajectory of the target object may include a captured trajectory of the target object in the input image and/or a predicted trajectory of the target object not captured in the input image.

The calculation of the trajectory has been described with reference to the trajectory calculator 230, and its detailed description is omitted.

The method includes the steps of selecting the nearby object at a predetermined distance from the trajectory of the target object (S400), and selecting the main object interacting with the target object among the nearby objects (S500).

The predetermined distance may be set before the step S200 or may be an input value with the input of the step S200.

In an embodiment, the main object may be selected by extracting the interaction attributes (S511 to S516).

Figure 6:
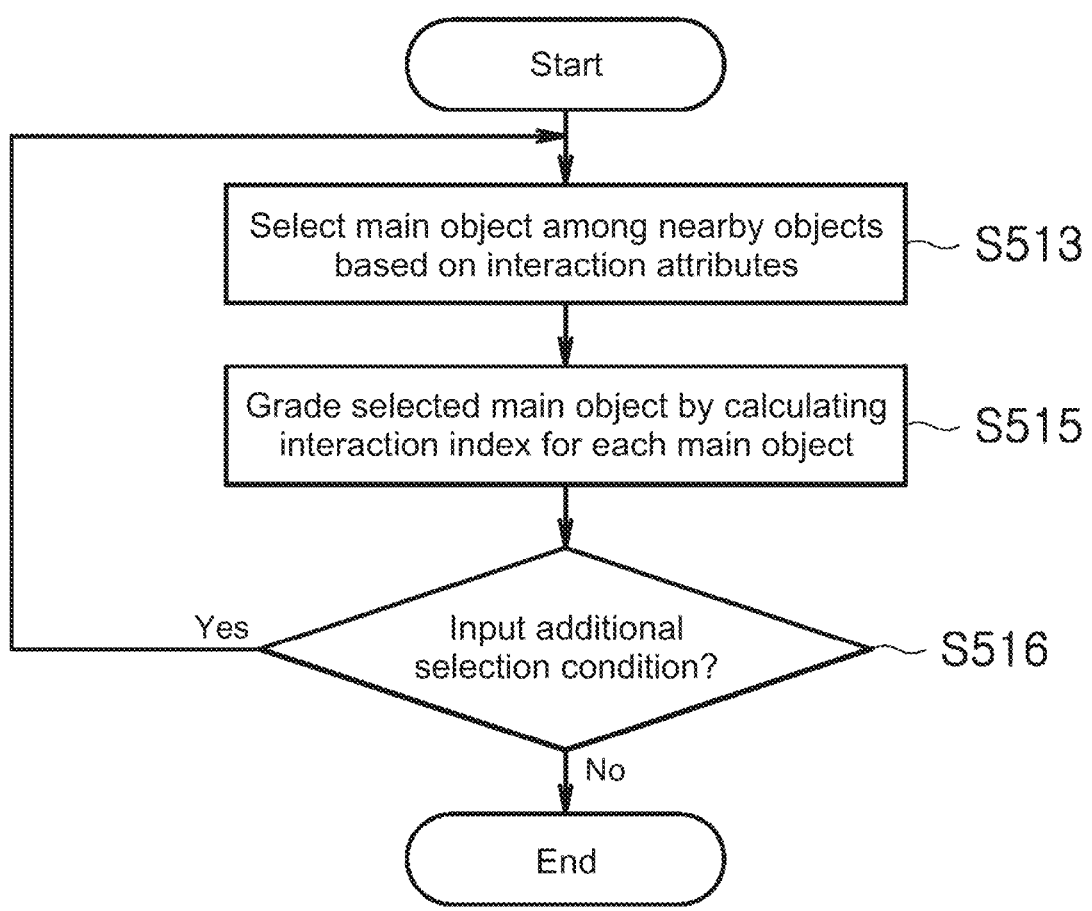
FIG. 6 is a detailed flowchart of a process of selecting a main object according to an embodiment of the present disclosure.

FIG. 6 is a detailed flowchart of the process of selecting the main object according to an embodiment of the present disclosure.

Referring to FIG. 6, the step S500 may include the step of extracting the interaction attributes between the nearby object selected in the step S400 and the target object and selecting the main object based on the extracted interaction attributes for each nearby object (S513).

In an embodiment, the interaction attributes may include the first type of interaction attribute, the second type of interaction attribute and/or the third type of interaction attribute.

Additionally, the step S500 may include the step of grading the main object selected in the step S513 (S515). The main object may be graded by calculating the interaction index between the selected main object and the target object (S515).

The grading may be performed through any one of the above Equations 1 to 4.

The process (S511 to S515) of selecting or grading the main object has been described above with reference to the main object selector 250, and its detailed description is omitted.

In an example of the input command in which the value of the predetermined distance is 10 m in the step S200, when the target object is a missing person, person A and a particular vehicle found in a CCTV within 10 m from the missing person may be selected as the primary main object.

Additionally, person C having relatively frequent contact with person A may be selected as the secondary main object.

In another embodiment, the main object may be selected by calculating the interaction index (S521 to S525).

Figure 7:
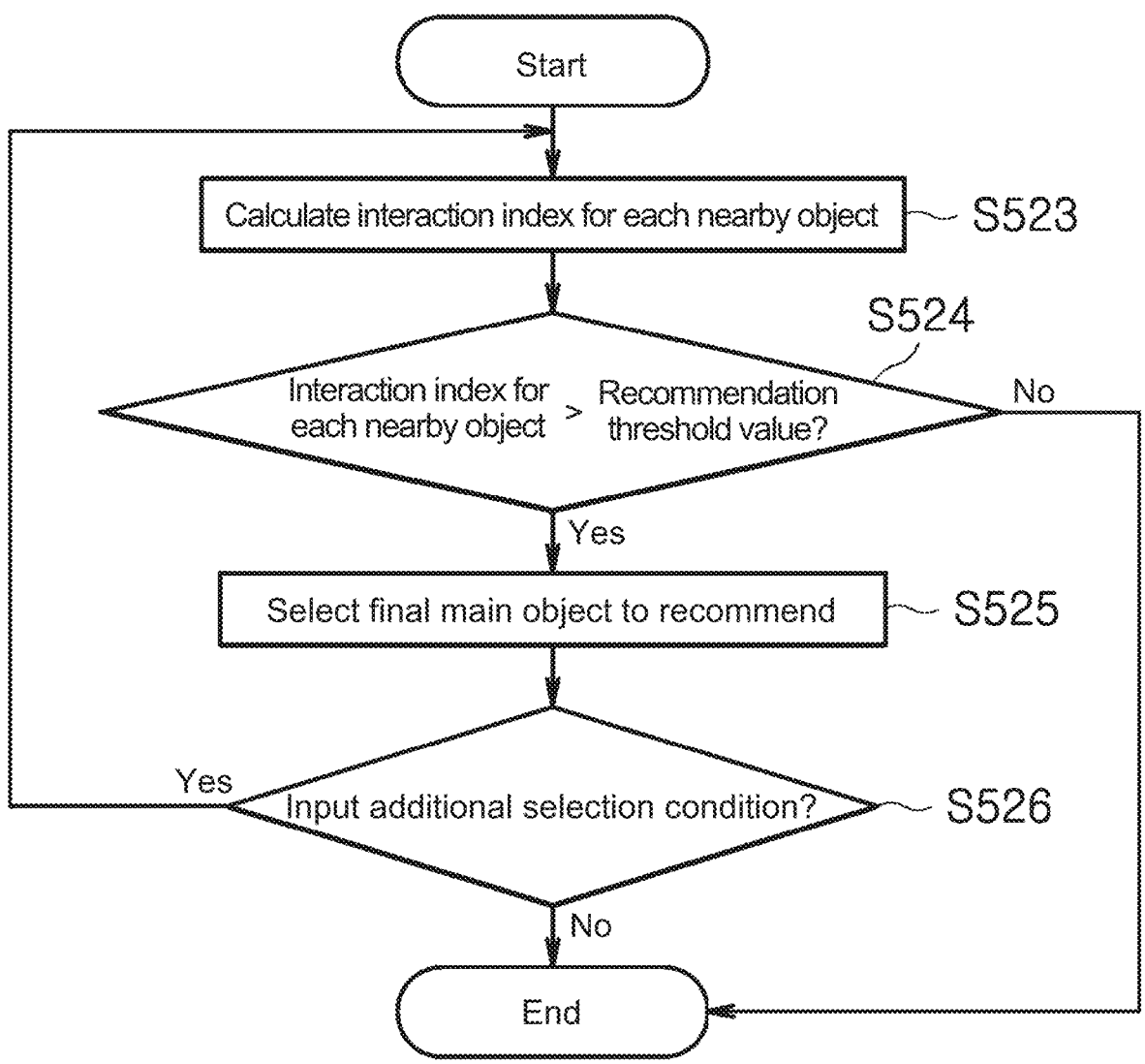
FIG. 7 is a detailed flowchart of a process of selecting a main object according to another embodiment of the present disclosure.

FIG. 7 is a detailed flowchart of the process of selecting the main object according to another embodiment of the present disclosure.

Referring to FIG. 7, the step S500 includes the step of calculating the interaction index for each nearby object (S523). The interaction index for each nearby object is calculated through any one of the above Equations 1 to 4.

The step S500 includes the step of selecting the final main object to recommend when the interaction index for each nearby object calculated in the step S523 exceeds the recommendation threshold value (S525).

Additionally, the step S500 may further include the step of inputting an additional selection condition (S516 or S526).

The main object is selected in the step S515 or S525, but to filter the main object having closer interaction among the selected main objects, the additional selection condition may be required. Then, the additional selection condition for reducing the range of the main object is inputted (S516 or S526).

The additional selection condition may be a condition for the predetermined distance for nearby object selection or the interaction attributes for main object selection. In the case of the additional selection condition for filtering to reduce the range of the main object, a value after the step S516 may be a smaller than a value before the step S516 for the same interaction attribute used in the step S513.

Then, the nearby object or the main object may be re-selected based on the additional selection condition in the step S513 of FIG. 6.

Alternatively, the nearby object or the main object may be re-selected based on the additional selection condition in the steps S521, S523, S525 of FIG. 7.

In alternative embodiments, the information of the target object may include at least part of the path on the captured trajectory of the target object in the entire input image. The target object may be described through the movement path. In case that the user already knows at least part of the path of the target object, the at least part of the path may be used to search for the input image including the target object (S200).

In this case, the calculation of the captured trajectory of the target object in the step S300 refers to calculation of the remaining captured trajectory except the input path.

Referring back to FIG. 5, the method may further include the step of generating a social graph based on the target object and the main object (S700).

In an embodiment, the social graph connected to a map may be generated (S700). To this end, the trajectory of the main object may be calculated.

In the step S700, the social graph of FIG. 3 or 4 may be provided to the user through the display 30.

The operation by the device and method for inferring a correlation between objects through image recognition according to the embodiments as described above may be, at least in part, implemented in a computer program and recorded in a non-transitory computer-readable recording medium. For example, it may be implemented with a program product on the non-transitory computer-readable medium including program code, and may be executed by the processor for performing any or all of the above-described steps, operations or processes.

The computer may be a computing device such as a desktop computer, a laptop computer, a notebook computer, a smart phone or like, and may be any integrated device. The computer is a device having at least one alternative and specialized processor, memory, storage and networking component (either wireless or wired). The computer may run, for example, Microsoft Windows-compatible operating systems (OSs), and OSs such as Apple OS X or iOS, Linux distribution, or Google's Android OS.

The non-transitory computer-readable recording medium includes all types of recording devices in which non-transitory computer-readable data is stored. Examples of the non-transitory computer-readable recording medium include read only memory (ROM), random access memory (RAM), compact disc read only memory (CD-ROM), magnetic tape, floppy disk and optical data storage. Additionally, the non-transitory computer-readable recording medium may be distributed over computer systems connected via a network, and may store and execute the non-transitory computer-readable code in a distributed manner. Additionally, a functional program, code and a code segment for realizing this embodiment will be easily understood by persons having ordinary skill in the technical field to which this embodiment belongs.

While the present disclosure has been hereinabove described with reference to the embodiments shown in the drawings, this is provided by way of illustration and those skilled in the art will understand that various modifications and variations may be made thereto. However, it should be understood that such modifications fall within the scope of technical protection of the present disclosure. Accordingly, the true technical protection scope of the present disclosure should be defined by the technical spirit of the appended claims.

What is claimed is:

1. A device for inferring a correlation between objects through image recognition, comprising:
   at least one processor; and
   a memory storing instructions which, when executed by the at least one processor, causes the at least one processor to:
   receive an image from a plurality of imaging devices;
   select a main object interacting with a target object at a predetermined distance in an input image or generate a social graph including the main object and the target object;
   extract attributes of an object in the image to generate object information;
   calculate a trajectory of the object:
   select a nearby object found within a predetermined distance from the target object along the trajectory of the target object among other objects than the target object; and
   select the main object interacted with the target object among the selected nearby objects by extracting interaction attributes between the selected nearby object and the target object,
   wherein the interaction attributes include a first type of interaction attribute, a second type of interaction attribute or a third type of interaction attribute,
   the first type of interaction attribute is an attribute of the nearby object itself, the second type of interaction attribute relies on a distance between the nearby object and the target object, and the third type of interaction attribute is a predefined action that when it is recognized that the action is done by a particular object, the particular object is regarded as the main object, and is at least one event attribute predefined as an action of a main person, and is extracted by the at least one processor, wherein the instructions which, when executed by the at least one processor, further cause the at least one processor to recognize the action of each detected object based on a set of attributes and, recognize the action using a training dataset, the training dataset includes a plurality of training samples, and each training sample includes at least one of attributes calculated from a training object and label data indicating the particular action predefined as the event.

2. The device for inferring a correlation between objects through image recognition according to claim 1, wherein the first type of interaction attribute includes at least one of a distance range value for determining as the nearby object, whether the object appeared in a view of the imaging device within the predetermined distance, an appearance frequency, a time for each appearance interval or a total appearance time.

3. The device for inferring a correlation between objects through image recognition according to claim 1, wherein the second type of interaction attribute includes at least one of a distance between the nearby object and the target object, a change in the distance between the nearby object and the target object over time, or regularity of the distance between the nearby object and the target object over time.

4. The device for inferring a correlation between objects through image recognition according to claim 1, wherein the set of attributes includes all or some of the attributes extracted by the at least one processor.

5. The device for inferring a correlation between objects through image recognition according to claim 1, wherein the instructions which, when executed by the at least one processor, further cause the at least one processor to: generate a set of semantic attributes for each of at least one object detected in the input image, and wherein the semantic attributes include at least one of an object probability with which the object is classified as a class, or an attribute probability indicating a probability of each attribute among the attributes associated with the object.

6. The device for inferring a correlation between objects through image recognition according to claim 1, wherein the instructions which, when executed by the at least one processor, further cause the at least one processor to grade the selected main object by calculating an interaction index indicating an interaction level between each main object and the target object.

7. The device for inferring a correlation between objects through image recognition according to claim 6, wherein the interaction index is calculated based on a weight for each of all or some of the interaction attributes.

8. The device for inferring a correlation between objects through image recognition according to claim 7, wherein the interaction index is calculated further based on a value of an event attribute.

9. The device for inferring a correlation between objects through image recognition according to claim 8, wherein the interaction index(S) is calculated through the following equation, $$S \leftarrow (\lambda_P P_{ij}, \lambda_T T_{ij}, \lambda_f f_{ij}) + e_{ij}$$ [Equation]

where S denotes the interaction index, P denotes a distance between the main object and the target object among the interaction attributes, T denotes an appearance time of the main object, f denotes an appearance frequency of the main object, λ denotes a weight for each attribute, and e denotes the value of the event attribute, i denotes an image index of the target object in the entire input image, and j denotes an image index of the nearby object, and ← denotes an assignment operator.

10. The device for inferring a correlation between objects through image recognition according to claim 1, wherein the instructions which, when executed by the at least one processor, further cause the at least one processor to:

calculate an interaction index for each selected nearby object, and select, as the main object, the nearby object having the calculated interaction index for each nearby object exceeding a preset recommendation threshold value.

11. The device for inferring a correlation between objects through image recognition according to claim 1, wherein the instructions which, when executed by the at least one processor, further cause the at least one processor to select the main object having an $n^{th}$ ordered relationship of interaction extended from the target object, wherein n is an integer of 2 or greater, and the $n^{th}$ ordered main object is calculated by replacing the target object with an $n-1^{th}$ ordered main object in an inference process used to calculate a primary main object.

12. The device for inferring a correlation between objects through image recognition according to claim 1, wherein the instructions which, when executed by the at least one processor, further cause the at least one processor to:

generate a social graph of tree structure by linking the main object from the target object.

13. The device for inferring a correlation between objects through image recognition according to claim 12, wherein the instructions which, when executed by the at least one processor, further cause the at least one processor to generate a social graph connected to a pre-stored map.

14. A method for inferring a correlation between objects through image recognition performed by a processor, the method comprising:

extracting attributes of an object in an input image to generate object information;

searching for a target object among the objects in the input image by inputting a command for starting an operation of inferring a main object interacting with the target object, wherein the command includes the attributes of the target object;

calculating a trajectory of the target object;

selecting a nearby object within a predetermined distance on the trajectory of the target object; and selecting the main object interacting with the target object among the nearby objects, wherein the selecting the main object comprises:

selecting the main object interacted with the target object among the selected nearby objects by extracting interaction attributes between the selected nearby object and the target object, the interaction attributes include a first type of interaction attribute, a second type of interaction attribute or a third type of interaction attribute, the first type of interaction attribute is an attribute of the nearby object itself, the second type of interaction attribute relies on a distance between the nearby object and the target object, and the third type of interaction attribute is a predefined action that when it is recognized that the action is done by a particular object, the particular object is regarded as the main object, and is at least one event attribute predefined as an action of a main person, and is extracted by a pre-trained action recognizer which is pre-stored in the memory, wherein the method further comprises recognizing the action of each detected object based on a set of attributes, the recognizing the action is performed by using a training dataset, the training dataset includes a plurality of training samples, and each training sample includes at least one of attributes calculated from a training object and label data indicating the particular action predefined as the event.

15. The method for inferring a correlation between objects through image recognition according to claim 14, wherein the command further includes at least one of a condition for interaction attributes, a condition for a range of the main object or a condition for a recommendation threshold value.

16. The method for inferring a correlation between objects through image recognition according to claim 14, wherein selecting the nearby object includes extracting interaction attributes between the selected nearby object and the target object, and selecting the main object based on the extracted interaction attributes for each nearby object.

17. The method for inferring a correlation between objects through image recognition according to claim 14, wherein selecting the nearby object includes:

calculating an interaction index for each nearby object; and selecting a final main object to recommend when the calculated interaction index for each nearby object exceeds a recommendation threshold value.

18. A non-transitory computer-readable recording medium having recorded thereon a program for performing the method for inferring a correlation between objects through image recognition, the program executable by a processor to cause the processor:

to extract attributes of an object in an input image to generate object information;

to search for a target object among the objects in the input image by inputting a command for starting an operation of inferring a main object interacting with the target object, wherein the command includes the attributes of the target object;

to calculate a trajectory of the target object;

to select a nearby object within a predetermined distance on the trajectory of the target object;

to select the main object interacting with the target object among the nearby objects; and to select the main object interacted with the target object among the selected nearby objects by extracting interaction attributes between the selected nearby object and the target object, wherein the interaction attributes include a first type of interaction attribute, a second type of interaction attribute or a third type of interaction attribute, the first type of interaction attribute is an attribute of the nearby object itself, the second type of interaction attribute relies on a distance between the nearby object and the target object, and the third type of interaction attribute is a predefined action that when it is recognized that the action is done by a particular object, the particular object is regarded as the main object, and is at least one event attribute predefined as an action of a main person, and is extracted by a pre-trained action recognizer which is pre-stored in the memory, wherein the program executable by a processor to cause the processor:

to recognize the action of each detected object based on a set of attributes, and to recognize the action using a training dataset, the training dataset includes a plurality of training samples, and each training sample includes at least one of attributes calculated from a training object and label data indicating the particular action predefined as the event.

* * * * *